United States Patent
Zessin et al.

(10) Patent No.: US 10,728,103 B2
(45) Date of Patent: Jul. 28, 2020

(54) EDGE DEVICE RESOURCING USING RECURSIVE LEDGER CHAINING

(71) Applicant: Dell Products L.P., Round Rock, TX (US)

(72) Inventors: Steven P. Zessin, Austin, TX (US); Liam B. Quinn, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 354 days.

(21) Appl. No.: 15/076,393

(22) Filed: Mar. 21, 2016

(65) Prior Publication Data

US 2017/0272342 A1  Sep. 21, 2017

(51) Int. Cl.
*H04L 12/24* (2006.01)
*H04W 4/70* (2018.01)
*H04L 12/721* (2013.01)

(52) U.S. Cl.
CPC .......... *H04L 41/145* (2013.01); *H04L 41/12* (2013.01); *H04L 45/26* (2013.01); *H04W 4/70* (2018.02)

(58) Field of Classification Search
CPC . H04L 43/0888; H04L 43/106; H04L 67/101; H04L 67/1014; H04L 67/1021; H04L 67/1023; H04L 67/1042; G06F 9/466; G06F 9/468; G06F 9/5055
See application file for complete search history.

(56) References Cited

U.S. PATENT DOCUMENTS

| | | | |
|---|---|---|---|
| 9,870,269 B1* | 1/2018 | Viswanathan | G06F 9/50 |
| 2003/0167329 A1* | 9/2003 | Kurakake | G06F 9/5044 709/226 |
| 2004/0230696 A1* | 11/2004 | Barach | H04L 45/00 709/238 |
| 2009/0201850 A1* | 8/2009 | Davis | G01S 5/0009 370/328 |
| 2010/0030357 A1* | 2/2010 | Tilove | G06Q 10/06 700/100 |
| 2010/0262717 A1* | 10/2010 | Critchley | H04L 12/42 709/251 |

(Continued)

OTHER PUBLICATIONS

U.S. Appl. No. 14/955,877, filed Dec. 1, 2015, 48 pages.

*Primary Examiner* — Dhairya A Patel
*Assistant Examiner* — Sandarva Khanal
(74) *Attorney, Agent, or Firm* — Baker Botts L.L.P.

(57) ABSTRACT

Edge device resourcing in a networked environment may employ a decentralized resource ledger structure to track information about edge device resources and their locations relative to other devices. Each entry of the decentralized resource ledger may include, for a respective edge device resource, a unique identifier, a time stamp indicating when it was created, resource type information, relative location information, or path information. Each of multiple nodes in the environment may include a constituent portion of the decentralized resource ledger structure. During periodic discovery operations or in response to a configuration change, one or more paths from a static non-edge device toward edge devices may be traversed, and any fresh resource information may be returned (recursively) back along the path to the static non-edge device. These operations may discover new paths between nodes (e.g., for self-healing). The decentralized resource ledger may be analyzed to predict resource availability.

17 Claims, 11 Drawing Sheets

(56) References Cited

U.S. PATENT DOCUMENTS

2013/0013888 A1* 1/2013 Lam .................. H04L 45/54
  711/206
2014/0304231 A1* 10/2014 Kamath .............. G06F 16/27
  707/634
2017/0163733 A1* 6/2017 Grefen ............... H04L 9/3236

* cited by examiner

| LEDGER 610 | | | |
|---|---|---|---|
| UNIQUE IDENTIFIER | TIMESTAMP OF ENTRY | RESOURCE COMPUTED | RELATION TO STATIC NODE $N$ |
| | | | |
| | | | |
| | | | |

| LEDGER 620 | | | |
|---|---|---|---|
| UNIQUE IDENTIFIER | TIMESTAMP OF ENTRY | RESOURCE COMPUTED | RELATION TO STATIC NODE $N$ |
| | | | |
| | | | |
| | | | |

| LEDGER 630 | | | |
|---|---|---|---|
| UNIQUE IDENTIFIER | TIMESTAMP OF ENTRY | RESOURCE COMPUTED | RELATION TO STATIC NODE $N$ |
| | | | |
| | | | |
| | | | |

FIG. 6A

LEDGER 610

| UNIQUE IDENTIFIER | TIMESTAMP OF ENTRY | RESOURCE COMPUTED | RELATION TO STATIC NODE N |
|---|---|---|---|
| GUID-A | 2015-01-3T07:16:14+01:01 | Distance item X has moved | N (local resource) |
| | | | |
| | | | |

LEDGER 620

| UNIQUE IDENTIFIER | TIMESTAMP OF ENTRY | RESOURCE COMPUTED | RELATION TO STATIC NODE N |
|---|---|---|---|
| | | | |
| | | | |
| | | | |

LEDGER 630

| UNIQUE IDENTIFIER | TIMESTAMP OF ENTRY | RESOURCE COMPUTED | RELATION TO STATIC NODE N |
|---|---|---|---|
| | | | |
| | | | |
| | | | |

| LEDGER 610 | | | |
|---|---|---|---|
| UNIQUE IDENTIFIER | TIMESTAMP OF ENTRY | RESOURCE COMPUTED | RELATION TO STATIC NODE $N$ |
| GUID-A | 2015-01-3T07:16:14+01:01 | Distance item X has moved | N (local resource) |
| GUID-B | 2015-12-3T07:06:05+50:33 | Thermal temperature | N -> N-1 |
| | | | |

| LEDGER 620 | | | |
|---|---|---|---|
| UNIQUE IDENTIFIER | TIMESTAMP OF ENTRY | RESOURCE COMPUTED | RELATION TO STATIC NODE $N$ |
| GUID-B | 2015-12-3T07:06:05+50:33 | Thermal temperature | N-1 |
| | | | |
| | | | |

| LEDGER 630 | | | |
|---|---|---|---|
| UNIQUE IDENTIFIER | TIMESTAMP OF ENTRY | RESOURCE COMPUTED | RELATION TO STATIC NODE $N$ |
| | | | |
| | | | |
| | | | |

FIG. 6C

| LEDGER 610 | | | |
|---|---|---|---|
| UNIQUE IDENTIFIER | TIMESTAMP OF ENTRY | RESOURCE COMPUTED | RELATION TO STATIC NODE $N$ |
| GUID-A | 2015-01-3T07:16:14+01:01 | Distance item X has moved | N (local resource) |
| GUID-B | 2015-12-3T07:06:05+50:33 | Thermal temperature | N -> N-1 |
| GUID-C | 2015-22-3T07:10:59+11:58 | Hydraulic Pressure | N -> N-1 -> N-2 |

| LEDGER 620 | | | |
|---|---|---|---|
| UNIQUE IDENTIFIER | TIMESTAMP OF ENTRY | RESOURCE COMPUTED | RELATION TO STATIC NODE $N$ |
| GUID-B | 2015-12-3T07:06:05+50:33 | Thermal temperature | N-1 |
| GUID-C | 2015-22-3T07:10:59+11:58 | Hydraulic Pressure | N-1 -> N-2 |
| | | | |

| LEDGER 630 | | | |
|---|---|---|---|
| UNIQUE IDENTIFIER | TIMESTAMP OF ENTRY | RESOURCE COMPUTED | RELATION TO STATIC NODE $N$ |
| GUID-C | 2015-22-3T07:10:59+11:58 | Hydraulic Pressure | N-2 |
| | | | |
| | | | |

FIG. 6D

EDGE DEVICE RESOURCING USING RECURSIVE LEDGER CHAINING

BACKGROUND

Field of the Disclosure

This disclosure relates generally to information handling systems and, more particularly, to edge device resourcing using recursive ledger chaining.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Internet of Things (IoT) devices continue to be implemented in a wide range of applications and environments. Edge devices are an integral part of fog computing, which relies heavily on the collaborative efforts of end-user client devices and/or near-user edge devices rather than relying primarily on cloud computing service data center resources. For example, with fog computing, many computing tasks can be performed by (and on) smart edge gateways and edge devices. In some cases, IoT edge devices and smart sensor networks are removed from or relocated within their environment. In these cases, the overall IoT network and connected resources may have to be rebalanced. Traditional load balancing schemes typically do not account for these scenarios, which can lead to unbalanced and unpredictable workload architectures. In some cases, IoT edge devices may wish to know the current and future availability of other local device capabilities and resources. However, the behavior of edge device resource availability can often be described as continuously ebbing and flowing, or highly dynamic. For example, the availability of edge devices might not be constant, particularly if these devices are part of a mobile environment.

SUMMARY

In one aspect, a disclosed method is for edge device resourcing using recursive ledger chaining. The method may include a first node in the networked environment performing a first operation to obtain one or more entries of a decentralized resource ledger structure, each entry of which comprises information about a respective edge device resource available to the first node.

In any of the disclosed embodiments, performing the first operation may include traversing a first path from the first node to a second node on the first path, the first path being a path from the first node to a given edge device resource available to the first node.

In any of the disclosed embodiments, performing the first operation may include determining whether the information about the given edge device resource contained in a constituent portion of the decentralized resource ledger structure residing on the second node is stale.

In any of the disclosed embodiments, performing the first operation may include, in response to determining that the information about the given edge device resource contained in the constituent portion of the decentralized resource ledger structure residing on the second node is stale, traversing the first path from the second node on the first path to a third node on the first path In any of the disclosed embodiments, performing the first operation may include determining whether information about the given edge device resource contained in a constituent portion of the decentralized resource ledger structure residing on the third node is stale.

In any of the disclosed embodiments, performing the first operation may include, in response to determining that the information about the given edge device resource contained in the constituent portion of the decentralized resource ledger structure residing on the third node is not stale, returning the information about the given edge device resource contained in the constituent portion of the decentralized resource ledger structure residing on the third node to the second node, updating the constituent portion of the decentralized resource ledger structure residing on the second node to reflect the information returned from the third node, returning the information about the given edge device resource contained in the constituent portion of the decentralized resource ledger structure residing on the second node to the first node, and updating a constituent portion of the decentralized resource ledger structure residing on the first node to reflect the information returned from the second node.

Another disclosed aspect includes a system comprising a plurality of nodes in a networked environment, each of which maintains a constituent portion of a decentralized resource ledger structure, each entry of which comprises information about a respective edge device resource, and at least one of which is an information handling system that includes a processor having access to a memory that stores instructions executable by the processor. Yet another disclosed aspect includes an article of manufacture including a non-transitory computer-readable medium storing instructions executable by a processor of a static non-edge device.

BRIEF DESCRIPTION OF THE DRAWINGS

For a more complete understanding of the present invention and its features and advantages, reference is now made to the following description, taken in conjunction with the accompanying drawings, in which:

FIGS. 6A-6D illustrate an example embodiment in which a decentralized resource ledger is updated as a chain of constituent resource ledgers is traversed.

DESCRIPTION OF PARTICULAR EMBODIMENT(S)

Figure 1:
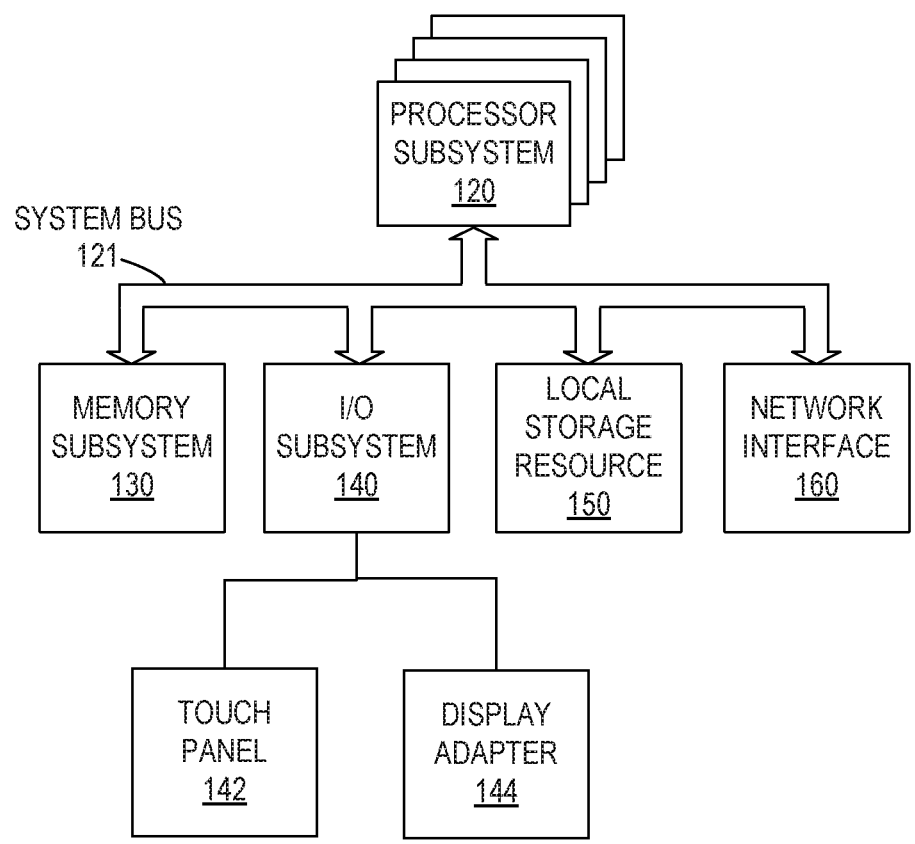
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

As will be described in further detail, the inventors of the present disclosure have developed methods and systems disclosed herein for edge device resourcing using recursive ledger chaining. In at least some embodiments of the present disclosure, this is mechanism may be implemented with an IoT network to assist with load-balancing and resource allocation. In some embodiments, edge device resourcing using recursive ledger chaining may be used in conjunction with other mechanisms to organize and manage the network. In some embodiments, there may exist edge devices and/or separate clouds that communicate and collaborate with each other to perform tasks. In some embodiments, different ones of the clouds may have access to different types of resources. When these edge devices or clouds are physically moved, communication paths between them may to temporarily or permanently broken.

The mechanisms described herein may be used to record the resources that a device or cloud knows about (and has access to) and the path to reach that resource in a decentralized resource ledger that includes a chain of constituent (local) ledgers. For example, a constituent ledger on a given node in a compute cluster may include an entry for a resource in a particular cloud that the compute node cluster can use to perform a task. The entry may include an identifier of the resource, and the path to traverse to reach that resource. In some cases, the path from a given node to a resource may include one or more intermediate nodes, clouds, or devices. In at least some embodiments, rather than relying on paths to various resources to always be there (which, for certain resources and resource types, is unlikely), the systems described herein may implement a flexible, decentralized resource ledger structure that can be updated dynamically.

In some embodiments, the decentralized resource ledger structure may be populated initially by a discovery process that queries one or more chains of constituent (local) ledgers. An initially populated ledger structure (or constituent portion thereof) may store information identifying the resources that are available to a node or device at a given point in time and the paths to reach them from the node or device. In some embodiments, the decentralized resource ledger structure may be updated periodically (e.g., by a discovery process) or in response to a change in the infrastructure that affects the available resources and/or the paths to and between them. For example, following a change in the infrastructure, a given resource may be moved and/or a different path may be needed to reach the given resource. In this case, one or more constituent portions of the decentralized resource ledger structure may be updated to identify the new location and/or path.

Particular embodiments are best understood by reference to FIGS. 1, 2, 3A-3B, 4A-4B, 5, and 6A-6D, wherein like numbers are used to indicate like and corresponding parts.

Turning now to the drawings, FIG. 1 illustrates a block diagram depicting selected elements of an embodiment of information handling system 100. As described herein, information handling system 100 may represent a personal computing device, such as a personal computer system, a desktop computer, a laptop computer, a notebook computer, etc., operated by a user. In various embodiments, information handling system 100 may be operated by the user using a keyboard and a mouse (not shown).

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol and/or standard, including, but not limited to, transmission protocols and/or standards enumerated below. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network coupled to network interface 160 and/or various components associated therewith may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130). In the same or alternative embodiments, processor subsystem 120 may interpret and/or execute program instructions and/or process data stored remotely (e.g., in a network storage resource, not shown).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. In system 100, I/O subsystem 140 may comprise a system, device, or apparatus generally operable to receive and/or transmit data to/from/ within information handling system 100. I/O subsystem 140 may represent, for example, a variety of communication interfaces, graphics interfaces, video interfaces, user input interfaces, and/or peripheral interfaces. As shown, I/O subsystem 140 may comprise touch panel 142 and display adapter 144. Touch panel 142 may include circuitry for enabling touch functionality in conjunction with a display device that is driven by display adapter 144. It is noted that when information handling system 100 is a laptop computer with an integrated display device, display adapter 144 may provide connectivity for an external display.

As will be described in further detail herein, information handling system 100 (or multiple instances of information handling system 100 that are communicatively coupled to each other) may support edge device resourcing using recursive ledger chaining.

As noted above, in an IoT environment, the number, location, and relative orientation of various edge devices may be highly dynamic. In one example, an IoT environment may include a fleet of smart trucks. These trucks will come into a depot, where some nodes may be introduced into the IoT environment (e.g., objects may be placed on the trucks), and other nodes may leave the IoT environment (e.g., objects may be removed from the trucks). In this example, within each smart truck, there may be hundreds or thousands of nodes (e.g., the boxes or containers within the truck) that are being moved around within, added to, or removed from the smart truck at different times.

Since IoT devices (including edge devices) may come into and out of the network (one or more times), they may not always have a direct connection to the static nodes or devices in the system or to each other. In some embodiments, these devices may implement peer-to-peer communications. In this type of dynamic (or fluid) environment, the mechanisms described herein for edge device resourcing using recursive ledger chaining may provide a way to map the nodes that are in the environment at a given time, and to track the origin of data for a resource (e.g., the point of generation) and the landing location of the data relative to other resources, smart nodes, and other peer-to-peer activities. In some embodiments, these mechanisms may also allow the system to self-heal following changes based on knowledge of nodes on the forward and aft side of each node. In such embodiments, the system may continue to reconfigure itself based on dynamic changes in the nodes, regardless of whether the changes are deliberate (e.g., due to a node being physically moved) or are due to an error or fault in one of the nodes themselves.

More specifically, in some embodiments, the network may have the ability to detect and self-configure based on end point mobility and dynamic fluctuations in the network. In some embodiments, transaction logging (e.g., creating or appending entries in one or more constituent ledgers of a decentralized resource ledger) may be triggered any time the state of an edge device resource changes from the current state. A recursive traversal of the decentralized resource ledger may be performed to update constituent (local) ledgers on nodes on any path that changes as a result of an edge device state change. For example, if a currently existing edge device becomes unavailable due to a break in the path between that edge device and a node/device that wishes to access it, that edge device (or a similar one) may be reachable on a different path. In some embodiments, one edge device resource change may affect hundreds of other edge devices (e.g., it may affect any edge devices that are accessible on paths that pass through the edge device on which the change occurred). Following such a change, the mechanisms described herein may be used to record the new orientation for the IoT infrastructure, allowing the system resources to be managed effectively despite the change. In at least some embodiments, an environment that implements edge device resourcing using recursive ledger chaining may perform predictive load balancing based on an analysis of the changes and current status of the edge devices in the system, as reflected in the decentralized resource ledger.

Figure 2:
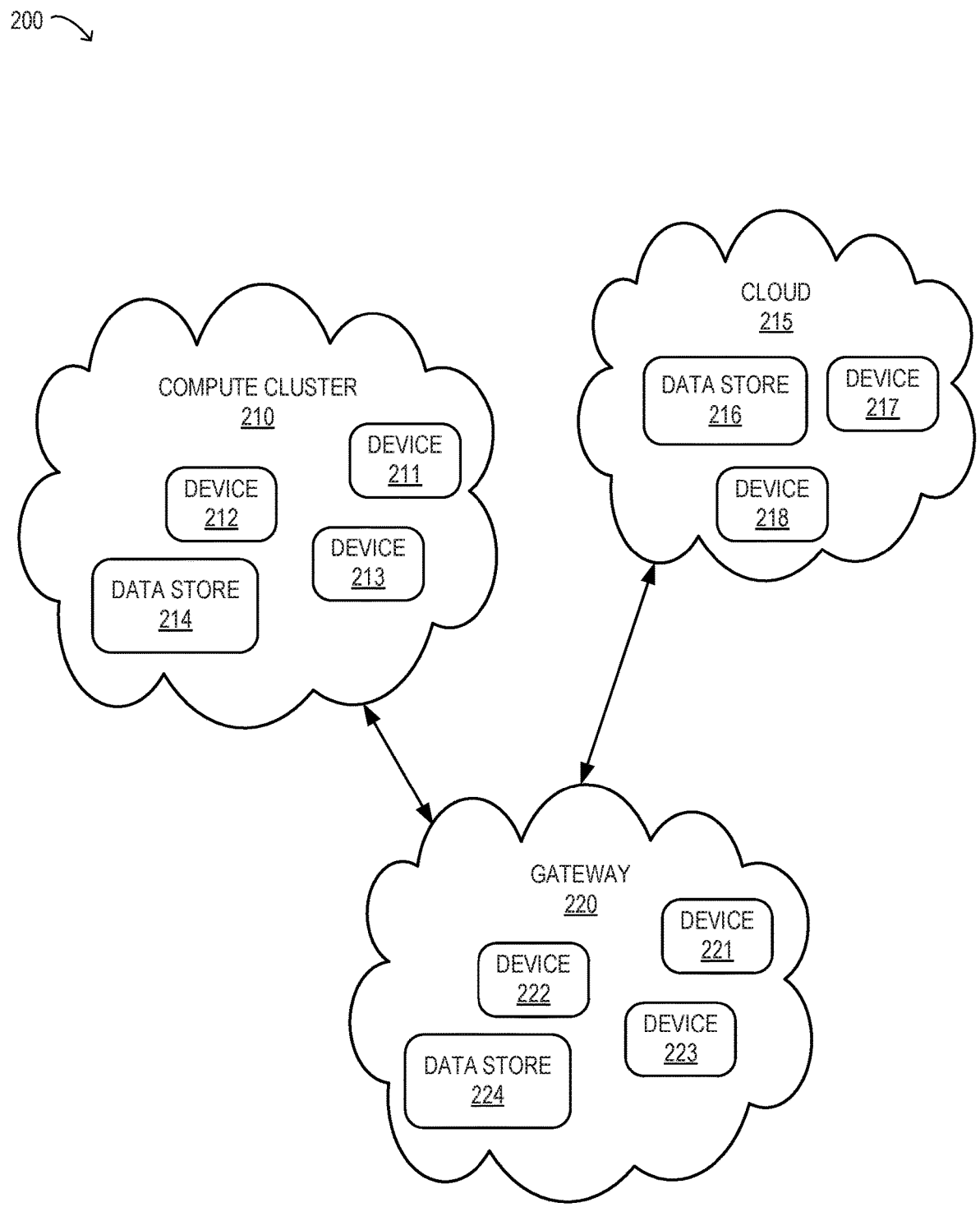
FIG. 2 is a block diagram of selected elements of an embodiment of system that includes multiple nodes, each of which has accesses to devices and/or data stores.

Turning now to FIG. 2, a block diagram of selected elements of an embodiment of system that includes multiple nodes, each of which has accesses to one or more devices (some of which may be edge devices) and/or data stores is illustrated. More specifically, FIG. 2 illustrates an example system 200 that includes a compute cluster 210, a cloud 215, and a gateway node 220. In various embodiments, compute cluster 210, cloud 215, and/or gateway node 220 may include, or be examples of, an information handling system (such as information handling system 100 illustrated in FIG. 1). In this example, compute cluster 210 include (or has local access to) a storage node shown as data store 214 and three other nodes/devices shown as device 212, device 213, and device 211, any of which may be edge devices. In this example, cloud 215 includes (or has local access to) a storage node shown as data store 216 and two other nodes/devices shown as device 217 and device 218, either of which may be an edge device. In this example, gateway node 220 includes (or has local access to) a storage node shown as data store 224 and other nodes/devices nodes/devices shown as device 221, device 222, and device 223, any of which may be edge devices.

In system 200, different ones of the nodes/devices may communicate with each other over a network (not shown) in order to make use of the resources that are distributed across system 200. For example, at least some of the devices of compute cluster 210 are communicatively coupled (e.g., in any suitable wired or wireless fashion) to one or more devices of gateway node 220 over a network (not shown), and the devices of gateway node 220 may provide resources to perform a task on behalf of a process executing on compute cluster 210. Similarly, at least some of the devices of gateway node 220 are communicatively coupled (e.g., in any suitable wired or wireless fashion) to one or more devices of cloud 215 over a network (not shown). In addition, at least some of the devices of compute cluster 210 may access one or more devices of cloud 215 over a network (not shown) and through gateway node 220. The network may be any suitable type of network including, for example, an ad hoc network, a personal area network (PAN), a local area network (LAN), a wide area network (WAN), a metropolitan area network (MAN), or one or more portions of the Internet or a combination of two or more of these network types. One or more portions of the network may be wired or wireless. For example, the network may include portions of a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

More specifically, in this example, each of the components of compute cluster 210 may access other ones of the components of compute cluster 210 (e.g., data store 214 or devices 211, 212, or 213) as local devices, or by traversing a path containing one or more intermediate nodes of computer cluster 210. In this example, at least some of the components of compute cluster 210 may access data store 224 or devices 221, 222, or 223 on gateway node 220 by traversing a path containing one or more intermediate nodes of compute cluster 210 and/or one or more intermediate nodes of gateway node 220. In this example, at least some of the components of compute cluster 210 may access data store 216 or devices 217 or 218 in cloud 215 by traversing a path containing one or more intermediate nodes of gateway node 220. In one embodiment, this path may also include one or more intermediate nodes of compute cluster 210 and/or cloud 215. In an embodiment other than that depicted in FIG. 2, at least some of the components of compute cluster 210 may access data store 216 or devices 217 or 218 in cloud 215 by traversing a path containing one or more intermediate nodes of compute cluster 210 and/or cloud 215 (e.g., without traversing any of the nodes/devices of gateway node 220).

Although not illustrated in FIG. 2, one or more of the nodes and/or devices of system 200 may, in particular embodiments, communicate with each other directly (e.g., wirelessly) or via any other suitable communication method.

In some embodiments of the present disclosure, the decentralized ledger structures described herein may be used in edge device resourcing in the system. For example, some or all of the smart nodes (such as compute cluster 210), gateway nodes (such as 220), clouds (such as 215), and/or individual devices within system 200 may implement a constituent portion of a decentralized resource ledger structure that includes information about the resources that are available locally and/or the resources that are accessible by traversing a specified path from the node on which the constituent ledger exists. In at least some embodiments, the decentralized resource ledger structure and its constituent ledgers may be created and/or updated using a discovery process, examples of which are described herein. In at least some embodiments, detection of the physical change of a device location within a smart node, gateway, or cloud may trigger a refresh of the decentralized resource ledger structures described herein.

In some embodiments, in order to remain economically viable, the mechanisms for populating and maintaining a decentralized ledger of device resources and their locations relative to one another described herein may rely on the fact that most, if not all, of the constituent ledgers are kept up to date. As described herein, a discovery process or an update process may recursively step through smart nodes and gateways to create, return, and manage ledger entries that reflect the availability of various resources. In some embodiments, these steps may be executed when a smart node or gateway learns that its ledger data has become stale. In some embodiments, a smart node or gateway node may be able to determine whether (and when) devices have been added, isolated, or moved within its own domain. In such embodiments, each node may update the transaction records within its own constituent (local) ledger when it determines that a device has been added or removed, or that a path to a resource has changed. In at least some embodiments, each ledger entry may be time-stamped when it is generated or when the resource information for that entry arrived or left a particular node. In this way, each node may be able to determine whether the data that is received (or returned) from another node is stale or is fresher than the contents in its constituent (local) ledger. For example, in some embodiments, a software portion of the constituent (local) ledger component on each node may compare the timestamps in the constituent (local) ledger and in ledger information that is received (or returned) from another node in order to determine whether or not the data in the constituent (local) ledger is stale.

Figure 3A:
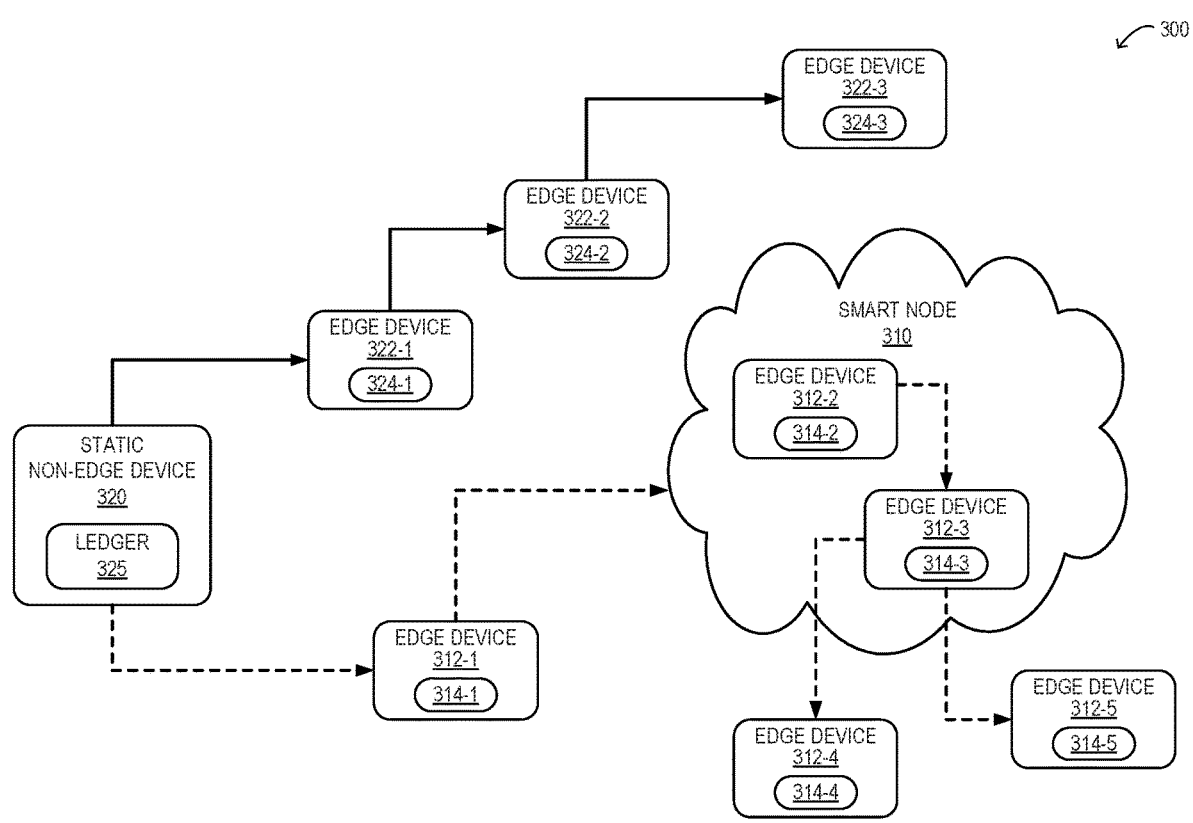
FIGS. 3A and 3B illustrate the use of recursive ledger chaining in a system, according to one embodiment.
Figure 3B:
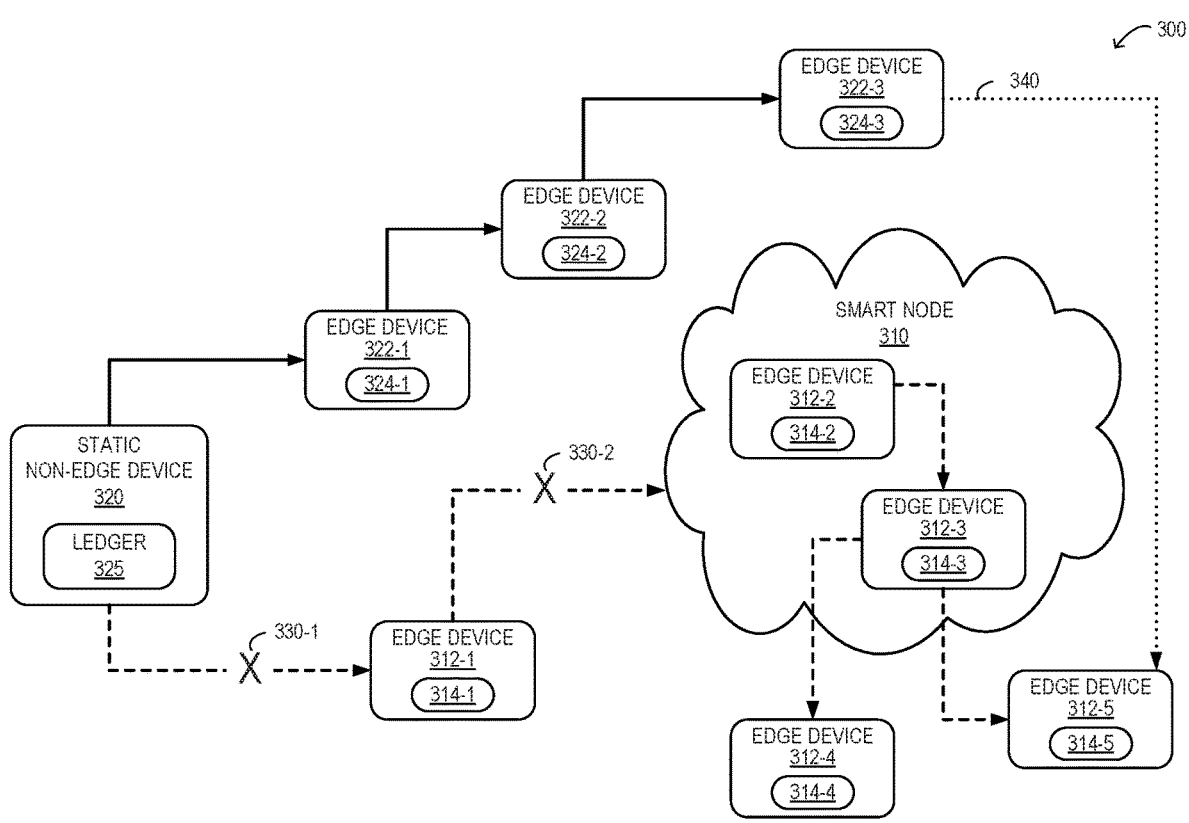

Referring now to FIGS. 3A and 3B, an example of the use of recursive ledger chaining in a system is illustrated, according to one embodiment. More specifically, FIG. 3A and FIG. 3B illustrate a system 300 that includes a static non-edge device 320, a smart node 310 (which may include computing/processing capability), and multiple edge devices 312 and 322. In various embodiments, static non-edge device 320, smart node 310, and/or any of edge devices 312 or 322 may include, or be examples of, an information handling system (such as information handling system 100 illustrated in FIG. 1). In FIGS. 3A and 3B, static non-edge device 320 may include computing/processing capability, and may also be referred to as a "smart node". For example, in some embodiments, static non-edge device 320 may be a node or a cloud that includes more computing power than some other devices (e.g., edge devices or other non-edge devices). In some embodiments, static non-edge device 320 may store a complete copy of the decentralized resource ledger structure. In some embodiments, static non-edge device 320 may perform at least some resource management tasks based on the information contained in the decentralized resource ledger structure (or its copy of the decentralized resource ledger structure) at a given point in time. In some embodiments, smart node 310 may include its own copy (or constituent portion) of the decentralized resource ledger structure. Smart node 310 may also include its own computing power, and may be capable of performing some resource management tasks. In the example illustrated in FIGS. 3A and 3B, the edge devices 312 and/or 322 may include one or more actuators, RFID sensors, or other types of sensors, including those that do not have the computing power of smart nodes or other large nodes.

In this example, each device or node within system 300 includes at least a portion of a decentralized resource ledger. In some embodiments, the constituent (local) ledger component within each device/node may include a portion of the decentralized resource ledger structure, as well as software or logic to manage its contents. For example, the constituent (local) ledger component within each device/node may include a software component that understands the structure of the decentralized resource ledger (or at least the local portion of the decentralized resource ledger) and how to update the ledger when the configuration changes. In some embodiments, the constituent (local) ledger component within each device/node may communicate with one or more other devices/nodes, and may synchronize its local ledger with the local ledgers on the other devices/nodes, assuming they also include a software component that understands the structure of the ledger and how to update it. In some embodiments, the local portion of the decentralized resource ledger structure may act as a type of local cache of ledger entries for the resources that the things the device/node knows about. For example, in the embodiment illustrated in FIGS. 3A and 3B, static non-edge device 320 includes a portion of a decentralized resource ledger (shown as ledger 325), each edge device 322 includes a respective portion of the decentralized resource ledger (shown as 324), and each edge device 312 includes a respective portion of the decentralized resource ledger (shown as 314). Each of the constituent (local) portions of the resource ledger includes information about the resources in system 300 that are available to the device/node on which it resides. This information may include the path by which the device/node is able to reach them. Collectively, the decentralized resource ledger may include a mapping of all the devices and resources in the system their relative locations. In some embodiments, the decentralized resource ledger may include information, for each device/node, indicating the device resource type, its orientation to other devices, a log of its availability, and/or a unique identifier for the resource, such as a globally unique identifier (GUID).

In some embodiments, an edge device (such as an actuator, RFID sensor, or other type of sensor) may not include much, if any, computing capability. Such an edge device may not store a lot of information in its constituent portion of the decentralized resource ledger. Instead, it may store just enough information to indicate where it is relative to its local neighbors (neighbor devices or nodes). On the other hand, larger nodes (including smart nodes, such as static non-edge device 320 or smart node 310) may maintain a constituent portion of the decentralized resource ledger (or a copy of the combined constituent ledgers) that, over time, grows as entries are appended to the ledger. For example, the resource ledger structure maintained on static non-edge device 320 may include information about all of the edge devices that are accessible to static non-edge device 320 locally and all of the edge devices that are accessible to static non-edge device 320 through one or more other devices/nodes on one or more paths toward those edge devices. In some embodiments, these larger/smarter nodes may include enough computing capability to be able to analyze the ledger (e.g., their respective constituent portions of the decentralized resource ledger or the decentralized resource ledger as a whole). In some embodiments, this analysis may be used to predict when resources are expected to come online. In other embodiments, this analysis may be used to determine an initial path or an optimum (shortest) path to traverse to a given resource, e.g., a resource from which to obtain a calculation or result. In still other embodiments, this analysis may be used to determine an alternate path to traverse to a given resource if a path to the given resource is broken or otherwise made unavailable.

FIG. 3A illustrates the state of system 300 at a given time zero. At the illustrated point in time, static non-edge device 320 is able to see (and/or utilize) all of the resources shown as edge devices 312 and 322 by traversing one of two paths. In this example, the resource ledger structure maintained on static non-edge device 320 may include information about all of the edge devices 312 and 322 and information about how to reach each of those resources on one of the two illustrated paths. For example, each entry in the ledger may include an identifier of one of those resources and an indication of the position of the resource relative to static non-edge device 320 (e.g., the path and/or distance to the resource from static non-edge device 320). In some embodiments, each entry in the ledger may include information about the resource type and/or its capacity.

In the example illustrated in FIG. 3A, a first path may be traversed from static non-edge device 320 to reach multiple edge devices 322. The devices on the first path (which is illustrated in FIGS. 3A and 3B by the solid arrows between the edge devices) include edge device 322-1, edge device 322-2, and edge device 322-3. In this example, static non-edge device 320 may have access to edge device 322-2 by traversing the first path from static non-edge device 320 to edge device 322-1 and then from edge device 322-1 to edge device 322-2. In the example illustrated in FIG. 3A, a second path may be traversed from static non-edge device 320 to multiple edge devices 312. The devices on the second path (which is illustrated in FIGS. 3A and 3B by the dashed arrows between the edge devices) include edge device 312-1, two edge devices on smart node 310 (shown as edge device 312-2 and edge device 312-3), edge device 312-4, and edge device 312-5. In this example, static non-edge device 320 may have access to edge device 322-5 by traversing the second path from static non-edge device 320 to edge device 312-1, from edge device 312-1 to edge device 312-2 on smart node 310, from edge device 312-2 on smart node 310 to edge device 312-3 on smart node 310, and finally from edge device 312-3 on smart node 310 to edge device 312-5.

In various embodiments of the present disclosure, the constituent resource ledger maintained on static non-edge device 320, on smart node 310, and/or on any of the edge devices 312 or 322 may be created and/or updated using any suitable discovery mechanism, including those described herein. In at least some embodiments, stale ledgers may be marked by a consensus mechanism in which a majority (or in some cases all) of multiple network validators come to agreement on the state of a ledger. In some such embodiments, a set of rules and procedures may allow a coherent set of facts to be maintained between multiple participating nodes. In at least some embodiments, if a ledger is not stale, it contains all valid subsequent ledger entries and orientation. In some such embodiments, when such a ledger is encountered by a discovery operation, further traversing of the nodes on the same path is unnecessary (i.e., redundant).

FIG. 3B illustrates the state of system 300 at a point in time subsequent to that illustrated in FIG. 3A. More specifically, FIG. 3B illustrates the state of system 300 following a loss of communication between two pairs of nodes/devices in system 300. In FIG. 3B, break 330-1 represents a loss of communication between static non-edge device 320 and edge device 312-1 on the second path. Similarly, break 330-2 represents a loss of communication between edge device 312-1 and smart node 310 on the second path. The loss of communication represented by these breaks may be the result of a malfunction on one of the devices/nodes, a device/node being removed from system 300, a device/node being shut down, a device/node being moved, or other circumstances, in different embodiments. In this example, because of these breaks, static non-edge device 320 no longer has access to the edge devices 312 on the second path. However, an alternate path 340 between edge device 322-3 and edge device 312-5 may be used to access one or more of the edge device 312 by static non-edge device 320.

In one example, due to a physical edge device change, edge device 322-3 may now be able to communicate with edge device 312-5 over alternate path 340. In another example, alternate path 340 between edge device 322-3 and edge device 312-5 may represent a peer-to-peer path between the two edge devices. In yet another example, alternate path 340 between edge device 322-3 and edge device 312-5 may represent a path between the two edge devices that includes ones or more intermediate devices/nodes (not shown). In some embodiments, alternate path 340 may be an existing path that was known (on at least some devices/node) and documented in the decentralized resource ledger structure, but was not in use at the point in time depicted in FIG. 3A. In other embodiments, alternate path 340 may be identified by a discovery operation that is initiated in response to a change in the configuration of the devices/nodes in system 300. For example, a change that resulted in break 330-1 or break 300-2 may have triggered a discovery operation to identify an alternate path between static non-edge node 320 and the edge devices 312. In at least some embodiments, any of a variety of changes in the resources of system 300 may trigger a discovery operation and a corresponding update to the ledger to reflect the altered state of system 300. In at least some embodiments, any new paths to the existing edge devices may be recursively computed and recorded, as described herein.

In one example, path 340 between edge device 322-2 and 312-5 may be discovered by edge device 322-3 itself, and edge device 322-3 may add an entry reflecting this discovery to ledger portion 324-3 on edge device 322-3. In this example, a discovery operation may subsequently find the entry that was added to ledger portion 324-3 by edge device 322-3 and may initiate the return of this ledger information (recursively) to the other edge devices 322 on the first path and to non-edge device 320. In another example, a discovery operation that traverses the nodes/devices on the first path may find path 340 between edge device 322-2 and 312-5 and may add an entry reflecting this discovery to ledger portion 324-3 on edge device 322-3. In one embodiment, path 340 may be an extension of the first path from static non-edge device 320 to edge devices 322-1, 322-2, and 322-3.

In this example, following the discovery of (or due to the existence of) path 340, static non-edge device 320 may have access to edge device 312-5 on the second path, as extended by path 340. For example, static non-edge device 320 may have access to edge device 312-5 by traversing the first path from static non-edge device 320 to edge device 322-1, from edge device 322-1 to edge device 322-2, and from edge device 322-2 to edge device 322-3, and then traversing path 340 from edge device 322-3 to edge device 312-5. In some embodiments, static non-edge device 320 may also gain access to edge device 312-3 through edge device 312-5 (on the second path), and may gain access to edge device 312-2 and edge device 312-4 through edge device 312-3 (on the second path). However, because two breaks 330 exiting in the first path (one on either side of edge device 312-1), static non-edge device 320 may not have access to edge device 312-1, in this example.

As noted above, in some embodiments, larger/smarter nodes may include enough computing capability to be able to analyze the ledger and predict when resources (e.g., edge devices) are expected to come online. In one example, an IoT network may include edge devices in the form of smart chairs in one or more conference rooms. In this example, the smart chairs may sometimes be moved within a given room or may be moved to another room. In some cases, one of the smart chairs may break and be removed from the network altogether. In this example, during certain times of the day or week, the housekeeping team may reset (or replace) the appropriate number of smart chairs in each room. This physical rearranging of the smart chairs illustrates the ebb and flow of their available capabilities. If the housekeeping team always puts the smart chairs back where they are supposed to be according to a fixed, observable schedule (e.g., once per week), that information may be used to predict the availability of smart chairs in the conference rooms. Similarly, for other types of edge devices for which availability is observed to be periodic, smart nodes in the network may be able to predict, based on patterns of availability observed in the decentralized resource ledger data, when certain resources are likely to become available. This is one way that keeping track of the orientation and relative orientation of resources using recursive ledger chaining may be used in edge device resource management.

In some embodiments, the mechanisms described herein may be used for predicting and planning for the availability of node resources in IoT environments with a large number of static nodes and edge devices (e.g., tens or hundreds of thousands of devices). These mechanisms may, based on information maintained in a decentralized resource ledger, autonomously and seamlessly be able to anticipate, predict, and manage edge device resource availability. In some embodiments, smart nodes and other devices/node with a relatively large amount of computing power may track the history of the state of each of multiple resources that are accessible to it. This may include maintaining a local ledger entry for each time a given resource joined (or rejoined) the network (e.g., through a direct connection with the smart node or on a path from the smart node to the given resource through one or more intermediate devices/node), and an entry for each time the given resource left the network for any reason. A process executing on the smart node may analyze that history to identify any patterns that can be used to make predictions about the availability of the given resource. In some embodiments, the accuracy of the prediction may be dependent on the amount of history that is maintained (collectively) in the decentralized resource ledger, the amount of history that is maintained in the constituent (local) ledgers, the frequency at which the decentralized resource ledger and/or the constituent (local) ledger are refreshed or updated, and/or the number of transactions that are present in the history. In some embodiments, the number of ledger entries maintained on a given node may be dependent on the size and/or type of local storage that is available on the smart node. For example, the number of ledger entries maintained on a given node may be dependent on whether or not the local storage is implemented using flash memory. In some embodiments, the constituent (local) ledgers may be flushed periodically, or when they reach a predetermined threshold on the number of entries. In some embodiments, a process executing on at least some of the devices/nodes may take snapshots of their local ledger entries periodically or in response to one or more predefined conditions at certain time slots. In some embodiments, a process executing on at least some of the devices/nodes may maintain ledger entries that were created or added to their local ledgers during a sliding window of time (e.g., a window of fixed duration). In other embodiments, a process executing on at least some of the devices/nodes may maintain the N most recently added ledger entries in their local ledgers, with older entries falling off when and if the space is needed.

Figure 4A:
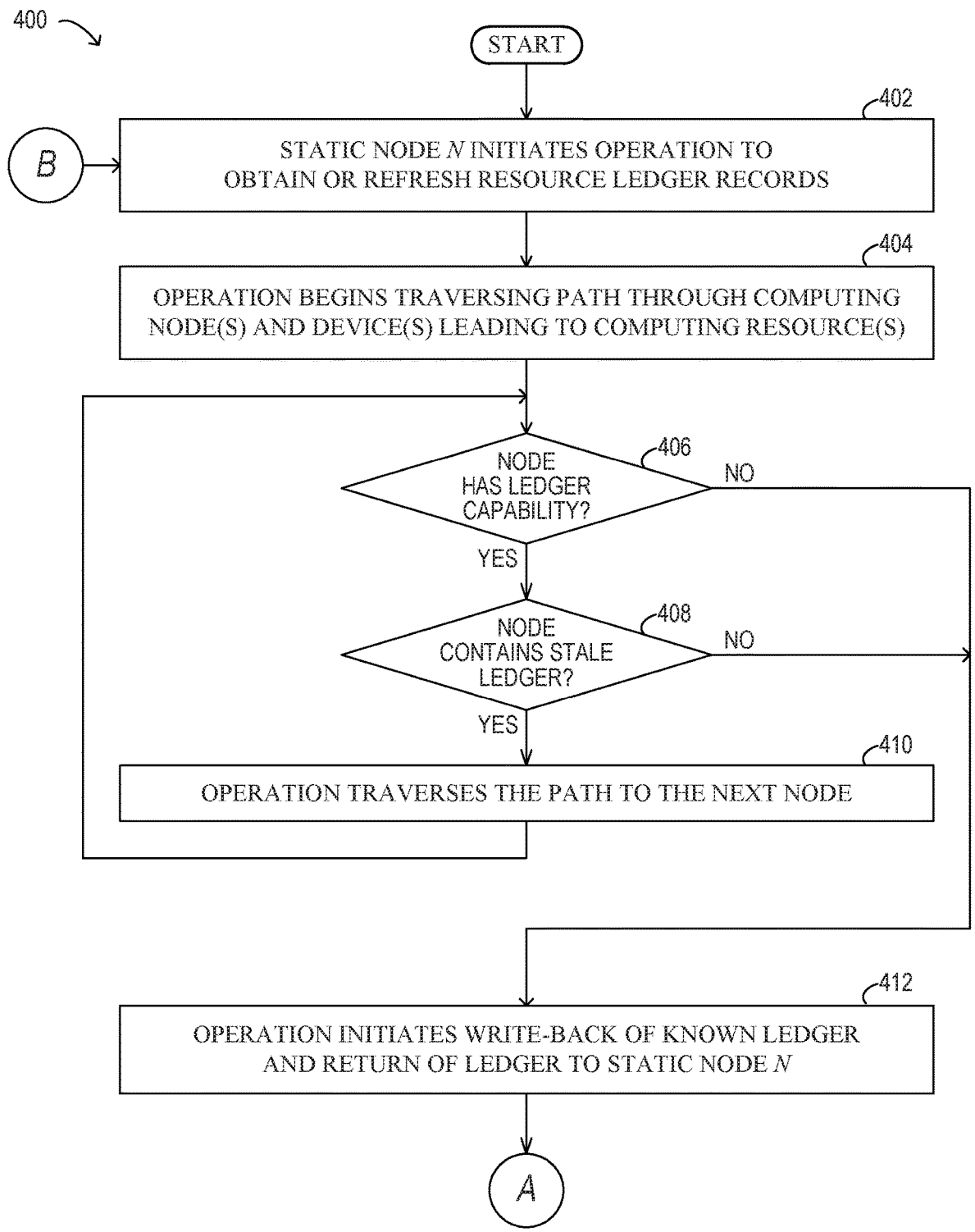
FIG. 4A is flowchart depicting selected elements of an embodiment of a method for discovering ledger resources.

Referring now to FIG. 4A, a block diagram of selected elements of an embodiment of method 400 for discovering ledger resources, as described herein, is depicted in flowchart form. In various embodiments, method 400 is performed by one or more nodes of a system 300 (see FIGS. 3A and 3B), such as by one or more instances of an information handling system 100 (see FIG. 1) that implements at least a portion of system 300. It is noted that certain operations described in method 400 may be optional or may be rearranged in different embodiments.

In FIG. 4A, method 400 may begin by initiating (at 402) on a static node n an operation to obtain or refresh the records of a decentralized resource ledger. In various embodiments, any of a variety of conditions or actions may trigger an operation to obtain or refresh the records of a decentralized resource ledger on a given node. For example, in some embodiments, the method may be initiated in response to a change in the infrastructure that affects the available resources and/or the paths to and between them. In some embodiments, the method may begin with static node n initiating a resource discovery request (e.g., periodically or in response to a trigger condition). In method 400, the discovery operation may begin traversing (operation 404) a path through one or more computing nodes and/or devices leading to various computing resources that are accessible to the static node n. In method 400, if (at 406) the first node visited on the path does not have ledger capability, the operation initiates (operation 412) a write-back of a known ledger and the return of that ledger to static node n. Examples of these operations are shown in more detail in FIG. 4B, beginning at connection point A, and described below.

Similarly, if (at 406) the first node visited on the path has ledger capability and if (at 408) it does not contain a stale ledger, the operation initiates (operation 412) a write-back of a known ledger and the return of that ledger to static node n. Examples of these operations are shown in more detail in FIG. 4B, beginning at connection point A, and described below.

In method 400, if (at 406) the first node visited on the path has ledger capability, but (at 408) it contains a stale ledger, the operation traverses (operation 410) the path to the next node in the path and repeats the operations shown as 406-408, as appropriate, for that next node.

Figure 4B:
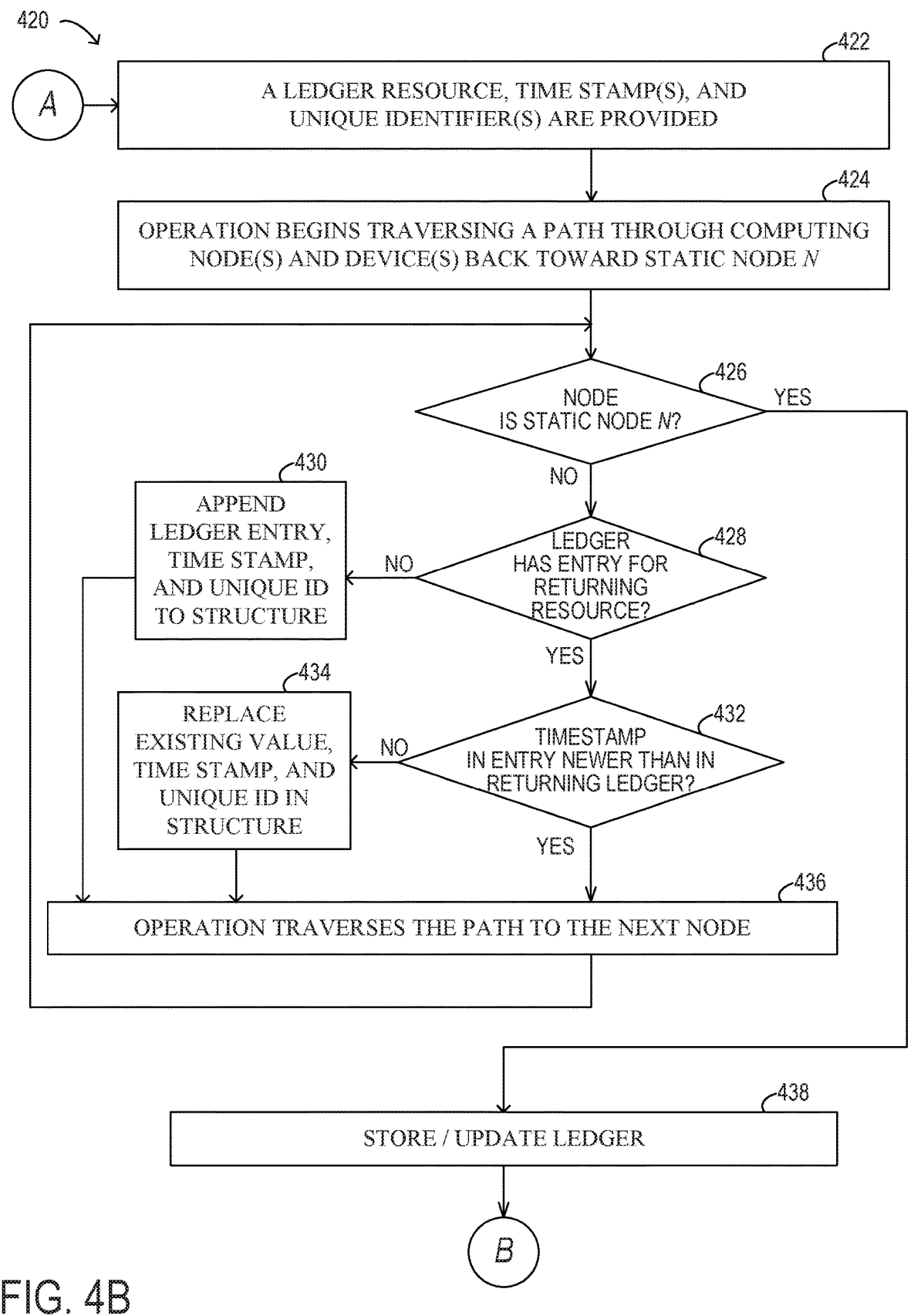
FIG. 4B is flowchart depicting selected elements of an embodiment of a method for returning ledger resources.

Referring now to FIG. 4B, a block diagram of selected elements of an embodiment of method 420 for returning ledger resources to one or more constituent ledgers in a decentralized resource ledger, as described herein, is depicted in flowchart form. In various embodiments, method 400 is performed by one or more nodes of a system 300 (see FIGS. 3A and 3B), such as by one or more instances of an information handling system 100 (see FIG. 1) that implements at least a portion of system 300. It is noted that certain operations described in method 420 may be optional or may be rearranged in different embodiments.

In FIG. 4B, method 420 may begin at connection point A in response to the performance of a discovery operation, such as that depicted in FIG. 4A. In method 420, a ledger resource, one or more time stamps, and one or more corresponding unique identifiers are provided (at 422). For example, the ledger resource, time stamp(s), and unique identifier(s) may be obtained through performance of the discovery operation. An operation to return ledger resources may begin traversing (operation 424) a path through one or more computing nodes and/or devices back toward static node n.

In method 420, if (at 426) the first node visited on the path is static node n, the returning resource information may be stored in (e.g., appended to) or used to update the portion of the decentralized resource ledger on static node n (operation 438). As illustrated in FIG. 4B by the connection to method 400 in FIG. 4A (shown as connection point B), after updating the decentralized resource ledger, method 400 and/or method 420 may be repeated, as appropriate. In other embodiments, these methods 400 and 420 may be performed serially, in parallel, continuously, periodically, or in response to certain predefined conditions (e.g., in response to changes in the devices/nodes and/or their orientations in the network).

In method 420, if (at 426) the first node visited on the path is not node static node n, and if (at 428) the ledger on that node does not include an entry for the returning resource, a ledger entry, including a timestamp, and unique identifier, may be appended to the ledger (operation 430), and the operation to return ledger resources may traverse (at 436) the path to the next node in the path.

In method 420, if (at 426) the first node visited on the path is not node static node n, if (at 428) the ledger on that node includes an entry for the returning resource, and if (at 432) the timestamp in that entry is not newer than the timestamp in an entry for the resource in the returning ledger, the existing value, timestamp, and unique identifier for the resource may be replaced (at 434) in the ledger structure on the visited node by the returning resource information, after which the operation to return ledger resources may traverse (at 436) the path to the next node in the path.

In method 420, if (at 426) the first node visited on the path is not node static node n and if (at 428) the ledger on that node includes an entry for the returning resource, but if (at 432) the timestamp in that entry is newer than the timestamp in an entry for the resource in the returning ledger, no changes need to be made to the ledger structure on the visited node. In this case, the operation to return ledger resources may traverse (at 436) the path to the next node in the path without making any changes to the ledger structure.

In method 420, when and if the operation traverses (at 436) the path to the next node (e.g., following operations 430, 432, or 434), the method may include repeating operations 426-436, as appropriate, for each additional node in the path. As noted above, method 400 may be repeated beginning at connection point A if initiated by a discovery operation (e.g., the same discovery operation or a different discovery operation) or by other trigger.

The decentralized resource ledger structures and constituent (local) ledgers described herein may take any of a variety of forms, in different embodiments. In one embodiment, the decentralized resource ledger structure may take the form of a linked-list of constituent (local) ledgers. In another embodiment, the decentralized resource ledger structure may be implemented using a variant of a block chain. For example, the decentralized resource ledger structure may include a chain of blocks, each of which includes information about one or more transactions involving a given resource from the perspective of a particular device/node. Other implementations of the decentralized resource ledger structures and constituent (local) ledgers described herein are possible, in other embodiments.

Figure 5:
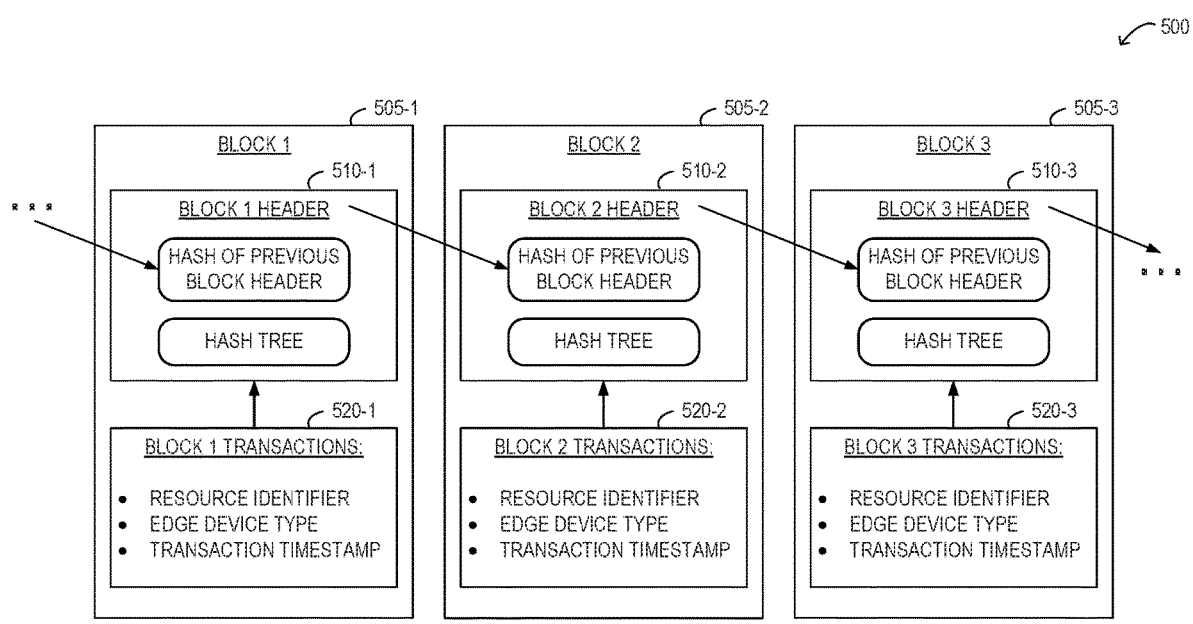
FIG. 5 illustrates an example resource ledger structure for use in recursive ledger chaining, according to one embodiment.

Referring now to FIG. 5, a block diagram of selected elements of an example embodiment of a resource ledger structure 500 for use in recursive ledger chaining is illustrated. In this example, three constituent blocks 505 within ledger structure 500 are illustrated. Each block 505 includes a respective block header 510 containing a hash of the immediately previous block header (if any exists) and a hash tree. In at least some embodiments, a Merkle tree or hash tree (or, in general, any type of hash list or hash chain) may be used to verify the data that is stored, handled, and transferred within and between edge devices. For example, hash trees may be used to ensure that data blocks received from other peers in a peer-to-peer network are received undamaged and unaltered.

In the example illustrated in FIG. 5, each block 505 also includes a respective set of one or more transactions, shown as 520. In at least some embodiments, each transaction may include a resource identifier, an edge device type, and/or a transaction timestamp. In this example, block 505-1 includes a block header 510-1 and block transactions list 520-1, block 505-2 includes a block header 510-2 and block transactions list 520-2, and block 505-3 includes a block header 510-3 and block transactions list 520-3. In some embodiments, each of the blocks 505 illustrated in FIG. 5 may be created and/or maintained in the constituent (local) ledger on a different device/node. In other embodiments, two or more of the blocks 505 illustrated in FIG. 5 may be created and/or maintained in the constituent (local) ledger on the same device/node. In some embodiments, at least one of the blocks 505 illustrated in FIG. 5 may be maintained in the constituent (local) ledgers of multiple devices/nodes.

In some embodiments, each block in a block chain that makes up a decentralized resource ledger structure may include a collection of transactions involving a single resource, from the perspective of a given device/node. For example, each block may include entries representing transactions involving a single resource that occurred (or were discovered) during a particular period of time. In other embodiments, each block in a block chain that makes up a decentralized resource ledger structure may include a collection of transactions that have been discovered or validated on a given device/node (e.g., during a given period of time) and that represent transactions involving any number of resources. In some embodiments, a return operation (such as method 420 illustrated in FIG. 4B) may return ledger entries on a block basis, rather than individually.

Referring now to FIGS. 6A-6D, an example embodiment in which a decentralized resource ledger 600 is updated as a chain of constituent resource ledgers is traversed is illustrated in block diagram form. In this example, ledger 610 represents a constituent resource ledger at a static non-edge node n, such as static non-edge node 320 (see FIGS. 3A and 3B). Ledger 620 represents a constituent resource ledger at a node n−1 that is one position removed from static non-edge node n along a path toward one or more resources (such, e.g., edge device 312-1 or edge device 322-1 in FIGS. 3A and 3B). Ledger 630 represents a constituent resource ledger at a node n−2 that is two positions removed from static non-edge node n along a path toward one or more resources (such, e.g., smart node 310, edge device 312-2, or edge device 322-2 in FIGS. 3A and 3B).

In this example, each ledger entry includes a unique identifier of a given resource, a timestamp indicating when the given resource was discovered and/or the entry for the given resource was created in (or appended to) at least one of the constituent ledgers of decentralized resource ledger 600, a computation or other result to be obtained from the resource (which may be indicative of the resource type), and its relation to the static node n (e.g., the path of nodes through which the static node accesses the resource). In other embodiments, each ledger entry may include more, less, or different information about a resource than the information in ledger 600 depicted in FIGS. 6A-6D. For example, in one embodiment, each ledger entry may include an explicit indication of the resource type. FIG. 6A illustrates that, prior to the initialization of ledger 600 by a discovery operation or by other means, the constituent ledgers 610, 620, and 630 are empty.

FIG. 6B illustrates that after a first step of a discovery operation (e.g., after traversing a path to one of one or more nodes, such as node n−1, that are accessible to the static node n locally or at a first position on a path between static node n and other resource), the constituent ledger 610 of ledger 600 includes a single entry. This entry includes a globally unique identifier (GUID) for a given resource, shown as GUID-A, and a timestamp indicating when the entry was created. The entry also includes an indication that the given resource is a local resource to static node n, and that it is used to determine the distance that an item X has moved. At this point in the discovery operation, constituent ledger 620 on node n−1 and constituent ledger 630 on node n−2 remain empty.

FIG. 6C illustrates that after a second step of a discovery operation (e.g., after traversing a path from a local node to one of one or more other nodes that are accessible to the local node), a second resource is discovered that is accessible to node n−1. Therefore, constituent ledger 620 on node n−1 includes an entry for the second resource. More specifically, the first entry in constituent ledger 620 includes a globally unique identifier (GUID) for the second resource, shown as GUID-B, and a timestamp indicating when the first entry in constituent ledger 620 was created. The first entry in constituent ledger 620 also includes an indication that the second resource is local to node n−1, and that it is used to provide a thermal temperature. After the second step of the discovery operation, constituent ledger 610 includes an additional (second) entry, which is largely a copy of the first entry in constituent ledger 620. However, unlike in the first entry of constituent ledger 620, the value in the last column of the second entry in constituent ledger 610 indicates that the second resource is not local resource to static node n, but is accessible to static node n through node n−1.

FIG. 6D illustrates that after a third step of a discovery operation (e.g., after traversing a path from a node that is accessible to a local node to one or more other nodes), a third resource is discovered that is accessible to node n−2. Therefore, constituent ledger 630 on node n−2 includes an entry for the third resource. More specifically, the first entry in constituent ledger 630 includes a globally unique identifier (GUID) for the third resource, shown as GUID-C, and a timestamp indicating when the first entry in constituent ledger 630 was created. The first entry in constituent ledger 630 also includes an indication that the third resource is local to node n−2, and that it is used to provide a hydraulic pressure. After the third step of the discovery operation, constituent ledger 620 includes an additional (second) entry, which is largely a copy of the first entry in constituent ledger 630. However, unlike in the first entry of constituent ledger 630, the value in the last column of the second entry in constituent ledger 620 indicates that the third resource is not local resource to node n−1, but is accessible to node n−1 through node n−2. In addition, after the third step of the discovery operation, constituent ledger 610 includes yet another (third) entry, which is largely a copy of the first entry in constituent ledger 630. However, unlike in the first entry of constituent ledger 630, the value in the last column of the third entry in constituent ledger 610 indicates that the third resource is not local resource to static node n, but is accessible to static node n through node n−1 and node n−2.

As described herein, in some embodiments of the present disclosure, complete or partial copies of a decentralized resource ledger may be maintained on every device/node. In some embodiments, these copies may be updated automatically after any transaction occurs. In other embodiments, these copies may be updated periodically or in response to other conditions (e.g., some entries may be flushed if the number of entries exceeds a threshold value). The mechanisms described herein may allow a decentralized sharing of edge device resources.

In some embodiments, it may not be necessary for all of the constituent (local) ledgers to be perfectly synchronized at all times. However, the system may implement some level of validation to be used in specific situations. For example, a node may wish to determine that a resource will be available when it is needed. In one embodiments, if a device/node wishes and expects to use a resource that it knows about (based on one or more entries in its local ledger) in the near future, it may initiate a validation operation ahead of time to determine that the resource itself is still available and that the path to the resource that is identified in its local ledger is still usable. In another embodiment, a process executing on at least some of these device/nodes that have more computing power (e.g., some static non-edge nodes and/or other smart nodes) may perform a periodic check to determine that the resources the device/node thinks are available on a given path are still there. Such a process may also check the ledgers on the other nodes on the given path to see whether any changes have taken place that the validating device/node does not yet know about. If so, the validation process may include appending its own local ledger and/or other ledgers on the nodes on the given path to include entries representing those changes. In one embodiment, the validation process may include writing a time-stamped record into its own local ledger and/or other ledgers on the nodes on the given path indicating that the ledger is known to be valid at that point. In some embodiments, one large device/node with more computing power (e.g., a static non-edge node and/or other type of smart node) may connect with another large device/node, and they may synchronize their local ledgers. In such embodiments, if there are any resources that are accessible to both, entries for the resources may be validated against each other.

As described in detail herein, in at least some embodiments, edge device resourcing in a networked environment may employ a decentralized resource ledger structure to track information about edge device resources and their locations relative to other devices. Each entry of the decentralized resource ledger may include, for a respective edge device resource, a unique identifier of the resource and a time stamp indicating when the entry was created. Additionally, the ledger may contain information about device resource types, the orientation of resources to other devices, and paths between various nodes/devices. At least some of the nodes in the environment may include a constituent portion of the decentralized resource ledger structure and software that understands how to update the local ledger. During periodic discovery operations or in response to configuration changes, one or more paths from a static non-edge device toward edge devices may be traversed, and any fresh resource information may be returned (recursively) back along the path to the static non-edge device. These operations may discover new paths between nodes (e.g., for self-healing following the loss of a communication path between two nodes/devices).

Just as big data may be used to better predict customer needs and wants, the recursive ledger chaining mechanisms described herein may be used for predicting and managing edge device resource availability. For example, they may provide the ability of a collection of edge devices and nodes to utilize a recursive ledger chaining algorithm to manage and track information about transactions (e.g., the comings and goings of edge device resources), including information indicating when and where each transaction occurred. In at least some embodiments, the decentralized resource ledger may be implemented as a distributed database that maintains a continuously growing list of data records. The capabilities described herein may provide a mechanism for an IoT infrastructure to be able to autonomously anticipate, predict, and/or manage edge device resource availability.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for edge device resourcing in a networked environment, comprising:

a first node in the networked environment performing a first operation to obtain one or more entries of a decentralized resource ledger structure, each entry of which comprises information about a respective edge device resource available to the first node including data specifying a respective path of nodes to be traversed from a node on which a constituent portion of the decentralized resource ledger structure containing information about the respective edge device resource resides to a physical edge device on which the respective edge device resource resides, wherein each entry of the decentralized resource ledger structure comprises a time stamp indicating when the entry was created on one of a plurality of nodes in the networked environment, wherein a first entry of the decentralized resource ledger structure in a constituent portion of the decentralized resource ledger structure residing on the first node includes data specifying a first path of nodes to be traversed from the first node to a physical edge device on which a first edge device resource available to the first node resides, the first path including a first portion from the first node to a second node on the first path and a second portion from the second node to a third node on the first path, and wherein performing the first operation comprises:

traversing the first portion of the first path from the first node to the second node on the first path;

determining whether information about the first edge device resource contained in an entry in a constituent portion of the decentralized resource ledger structure residing on the second node is stale, wherein determining whether the information about the first edge device resource contained in the entry in the constituent portion of the decentralized resource ledger structure residing on the second node is stale comprises comparing a time stamp within an entry in the constituent portion of the decentralized resource ledger structure residing on the second node that contains information about the first edge device resource with a time stamp within an entry in a constituent portion of the decentralized resource ledger structure residing on the first node that contains information about the first edge device resource; and in response to determining that the information about the first edge device resource contained in the entry in the constituent portion of the decentralized resource ledger structure residing on the second node is stale:

traversing the second portion of the first path from the second node on the first path to the third node on the first path;

determining whether information about the first edge device resource contained in an entry in a constituent portion of the decentralized resource ledger structure residing on the third node is stale; and in response to determining that the information about the first edge device resource contained in the entry in the constituent portion of the decentralized resource ledger structure residing on the third node is not stale:

returning the information about the first edge device resource contained in the entry in the constituent portion of the decentralized resource ledger structure residing on the third node to the second node;

updating the entry in the constituent portion of the decentralized resource ledger structure residing on the second node to reflect the information returned from the third node;

returning the information about the first edge device resource contained in the updated entry in the constituent portion of the decentralized resource ledger structure residing on the second node to the first node; and updating the first entry in the constituent portion of the decentralized resource ledger structure residing on the first node to reflect the information returned from the second node.

2. The method of claim 1, wherein each entry of the decentralized resource ledger structure comprises one or more of: a unique identifier of the respective edge device resource, an indication of a resource type for the respective edge device resource, and data identifying a position of the respective edge device resource relative to a particular other node in the networked environment.

3. The method of claim 1, wherein:
the method further comprises detecting a change in a configuration of nodes in the networked environment; and
the first operation is performed in response to detecting the change.

4. The method of claim 1, wherein updating the first entry in the constituent portion of the decentralized resource ledger structure residing on the first node comprises one or more of:
updating data identifying a position of the first edge device resource relative to a particular other node in the networked environment to reflect that the position of the first edge device resource relative to the particular other node has changed; or
updating the data specifying the first path of nodes to be traversed from the first node to the physic al edge device on which the first edge device resource resides to reflect that the path from the first node to the physical edge device on which the first edge device resource resides has changed.

5. The method of claim 1, wherein:
the first path is one of two or more paths from the first node to physical edge devices in the networked environment;
a second entry in the constituent portion of the decentralized resource ledger structure residing on the first node includes data specifying a second path of nodes to be traversed from the first node to a physical edge device on which a second edge device resource available to the first node resides; and
the first operation further comprises:
traversing a portion of the second path from the first node to a fourth node on the second path; and
determining whether information about the second edge device resource contained in an entry in a constituent portion of the decentralized resource ledger structure residing on the fourth node is stale.

6. The method of claim 1, further comprising:
analyzing two or more entries of the decentralized resource ledger structure; and
performing, dependent on results of the analyzing, one or more of:
predicting future availability of one or more edge device resources;
predictive load balancing for one or more edge device resources, wherein the predictive load balancing is dependent on changes and current status of the edge devices in the system reflected in the decentralized resource ledger;
determining the first path;
determining a shortest path to the physical edge device on which the first edge device resource resides; and
determining an alternate path to the physical edge device on which the first edge device resource resides when the first path or the shortest path is broken or unavailable.

7. A system for edge device resourcing in a networked environment, comprising:
a plurality of nodes in a networked environment, each of which maintains a constituent portion of a decentralized resource ledger structure, each entry of which comprises information about a respective edge device resource including data specifying a respective path of nodes to be traversed from a node on which a constituent portion of the decentralized resource ledger structure containing information about the respective edge device resource resides to a physical edge device on which the respective edge device resource resides, wherein each entry of the decentralized resource ledger structure comprises a time stamp that indicates when the entry was created on one of the plurality of nodes, wherein a first entry of the decentralized resource ledger structure in a constituent portion of the decentralized resource ledger structure residing on a first one of the nodes includes data specifying a first path of nodes to be traversed from the first node to a physical edge device on which a given edge device resource available to the first node resides, the first path including a first portion from the first node to a second node on the first path and a second portion from the second node to a third node on the first path;
wherein the first node is an information handling system comprising a processor having access to a memory, wherein the memory stores instructions that, when executed by the processor, cause the processor to:
traverse the first portion of the first path from the first node to the second node on the first path;
determine whether information about the first edge device resource contained in an entry in a constituent portion of the decentralized resource ledger structure that resides on the second node is stale, wherein to determine whether the information about the first edge device resource contained in the entry in the constituent portion of the decentralized resource ledger structure that resides on the second node is stale, the instructions cause the processor to compare a time stamp within an entry in the constituent portion of the decentralized resource ledger structure that resides on the second node that contains information about the first edge device resource with a time stamp within an entry in a constituent portion of the decentralized resource ledger structure that resides on the first node that contains information about the first edge device resource;
in response to a determination that the information about the first edge device resource contained in the entry in the constituent portion of the decentralized resource ledger structure that resides on the second node is stale:
traverse the second portion of the first path from the second node on the first path to the third node on the first path; and in response to a determination that the information about the first edge device resource contained in an entry in the constituent portion of the decentralized resource ledger structure that resides on the second node is not stale:
update the first entry in the constituent portion of the decentralized resource ledger structure that resides on the first node to reflect the information about the first edge device resource contained in the entry in the constituent portion of the decentralized resource ledger structure that resides on the second node.

8. The system of claim 7,
wherein the first path further comprises a third portion from the third node to a fourth node on the first path; and
wherein the second node comprises a processor having access to a memory, wherein the memory stores instructions that, when executed by the processor on the second node, cause the processor on the second node to:
determine whether information about the first edge device resource contained in an entry in a constituent portion of the decentralized resource ledger structure that resides on the third node is stale;
in response to a determination that the information about the first edge device resource contained in the entry in the constituent portion of the decentralized resource ledger structure that resides on the third node is stale:
traverse the third portion of the first path from the third node on the first path to the fourth node on the first path; and
in response to a determination that the information about the first edge device resource contained in the entry in the constituent portion of the decentralized resource ledger structure that resides on the third node is not stale:
update the entry in the constituent portion of the decentralized resource ledger structure that resides on the second node to reflect the information about the first edge device resource contained in the entry in the constituent portion of the decentralized resource ledger structure that resides on the third node.

9. The system of claim 7, wherein the instructions comprise a discovery operation that is performed periodically to validate or refresh the information contained in the decentralized resource ledger structure.

10. The system of claim 7, wherein the instructions comprise a self-healing operation that is performed in response to detection of a change in a configuration of the plurality of nodes in the networked environment, the self-healing operation comprising discovering a new path from the first node to the physical edge device on which the first edge device resource resides when the first path from the first node to the physical edge device is broken or unavailable.

11. The system of claim 7, wherein to update the first entry in the constituent portion of the decentralized resource ledger structure that resides on the first node, the instructions cause the processor to:
update data that identifies a position of the first edge device resource relative to a particular other node in the networked environment to reflect that the position of the first edge device resource relative to the particular other node has changed; or update the data that specifies the first path of nodes to be traversed from the first node to the physical edge device on which the first edge device resource resides to reflect that the path from the first node to the physical edge device on which the first edge device resource resides has changed.

12. The system of claim 7, wherein the instructions further cause the processor to:
analyze two or more entries of the decentralized resource ledger structure; and
perform, dependent on results of the analysis, one or more of:
predicting a future availability of one or more edge device resources;
predictive load balancing for one or more edge device resources, wherein the predictive load balancing is dependent on changes and current status of the edge devices in the system reflected in the decentralized resource ledger;
determining the first path;
determining a shortest path to the physical edge device on which the first edge device resource resides; and
determining an alternate path to the physical edge device on which the first edge device resource resides when the first path or the shortest path is broken or unavailable.

13. The system of claim 7, wherein:
the first path is one of two or more paths from the first node to physical edge devices in the networked environment;
a second entry in the constituent portion of the decentralized resource ledger structure residing on the first node includes data specifying a second path of nodes to be traversed from the first node to a physical edge device on which a second edge device resource available to the first node resides; and
the instructions further cause the processor to:
traverse a portion of the second path from the first node to a fourth node on the second path; and
determine whether information about the second edge device resource contained in an entry in a constituent portion of the decentralized resource ledger structure that resides on the fourth node is stale.

14. The system of claim 7, wherein the decentralized resource ledger structure comprises a linked-list of constituent ledger structures.

15. An article of manufacture comprising a non-transitory computer-readable medium storing instructions for edge device resourcing in a networked environment, that, when executed by a processor of a static non-edge device, cause the processor to:
traverse a first portion of a first path from the static non-edge device to a second node on the first path, wherein the first path comprises a first specified path of nodes to be traversed from the static non-edge device to a physical edge device on which a given edge device resource available to the static non-edge device, and about which information is contained in a decentralized resource ledger structure, resides, wherein each entry of the decentralized resource ledger structure comprises data specifying a respective path of nodes to be traversed from a node on which a constituent portion of the decentralized resource ledger structure containing information about a respective edge device resource resides to a physical edge device on which the respective edge device resource resides, wherein each entry of the decentralized resource ledger structure comprises a time stamp that indicates when the entry was created on one of the plurality of nodes, and wherein a first entry of the decentralized resource ledger structure in a constituent portion of the decentralized resource ledger structure residing on the static non-edge device includes data specifying the first path of nodes, the first path including the first portion from the static non-edge device to the second node on the first path and a second portion from the second node to a third node on the first path;
determine whether information about the given edge device resource contained in an entry in a constituent portion of the decentralized resource ledger structure that resides on the second node is stale, wherein to determine whether the information about the given edge device resource contained in the entry in the constituent portion of the decentralized resource ledger structure that resides on the second node is stale, the instructions cause the processor to compare a time stamp within an entry in the constituent portion of the decentralized resource ledger structure that resides on the second node that contains information about the given edge device resource with a time stamp within an entry in a constituent portion of the decentralized resource ledger structure that resides on the static non-edge device that contains information about the given edge device resource;
in response to a determination that the information about the given edge device resource contained in the entry in the constituent portion of the decentralized resource ledger structure that resides on the second node is stale:
traverse the second portion of the first path from the second node on the first path to the third node on the first path; and
in response to a determination that the information about the given edge device resource contained in an entry in the constituent portion of the decentralized resource ledger structure that resides on the second node is not stale:
update the first entry in the constituent portion of the decentralized resource ledger structure that resides on the static non-edge device to reflect the information about the given edge device resource contained in the entry in the constituent portion of the decentralized resource ledger structure that resides on the second node.

16. The article of manufacture of claim 15, wherein to update the first entry in the constituent portion of the decentralized resource ledger structure that resides on the static non-edge device, the instructions cause the processor to:
update data that identifies a position of the given edge device resource relative to a particular other node in the networked environment to reflect that the position of the given edge device resource relative to the particular other node has changed; or
update the data that specifies the first path of nodes to be traversed from the static non-edge device to the physical edge device on which the given edge device resource resides to reflect that the path from the static non-edge device to the physical edge device on which the given edge device resource resides has changed.

17. The article of manufacture of claim 15, wherein the instructions further cause the processor to:
analyze two or more entries of the decentralized resource ledger structure; and perform, dependent on results of the analysis, one or more of:
  predicting a future availability of one or more edge device resources;
  predictive load balancing for one or more edge device resources, wherein the predictive load balancing is dependent on changes and current status of the edge devices in the system reflected in the decentralized resource ledger;
  determining the first path;
  determining a shortest path to the physical edge device on which the given edge device resource resides; and
  determining an alternate path to the physical edge device on which the given edge device resource resides when the first path or the shortest path is broken or unavailable.

* * * * *